(12) United States Patent
Inada et al.

(10) Patent No.: US 8,223,220 B2
(45) Date of Patent: Jul. 17, 2012

(54) IMAGE PROCESSING DEVICE, IMAGE PROCESSING METHOD, AND INFORMATION STORAGE MEDIUM

(75) Inventors: Tetsugo Inada, Kanagawa (JP); Akio Ohba, Kanagawa (JP); Hiroyuki Segawa, Kanagawa (JP)

(73) Assignee: Sony Computer Entertainment Inc., Tokyo (JP)

( * ) Notice: Subject to any disclaimer, the term of this patent is extended or adjusted under 35 U.S.C. 154(b) by 98 days.

(21) Appl. No.: 12/993,858

(22) PCT Filed: Jan. 20, 2009

(86) PCT No.: PCT/JP2009/050715
§ 371 (c)(1),
(2), (4) Date: Dec. 30, 2010

(87) PCT Pub. No.: WO2009/144968
PCT Pub. Date: Dec. 3, 2009

(65) Prior Publication Data
US 2011/0102626 A1 May 5, 2011

(30) Foreign Application Priority Data

May 26, 2008 (JP) .................................. 2008-137188

(51) Int. Cl.
*H04N 5/228* (2006.01)
(52) U.S. Cl. .................................................... 348/222.1
(58) Field of Classification Search ................ 348/222.1
See application file for complete search history.

(56) References Cited

U.S. PATENT DOCUMENTS
6,714,660 B1 3/2004 Ohba

FOREIGN PATENT DOCUMENTS
JP 2006228061 A 8/2006

OTHER PUBLICATIONS

International Preliminary Report on Patentability and Written Opinion for corresponding application PCT/JP2009/050715, dated Jan. 11, 2011.
International Search Report for corresponding application PCT/JP2009/050715, dated Mar. 3, 2009.
Japanese Office action for corresponding JP Application 2008-137188, dated Jan. 4, 2011.

*Primary Examiner* — Usman Khan
(74) *Attorney, Agent, or Firm* — Matthew B. Dernier, Esq.; Gibson & Dernier LLP

(57) ABSTRACT

Provided is an image processing device, an image processing method, and a program which can prevent a total processing time from significantly increasing while maintaining precision of image processing at a high level, where an image acquiring section sequentially acquires images generated by imaging a predetermined subject to be imaged; an image processing executing section executes, in each of sequentially-arriving processing periods, image processing on the image acquired by the image acquiring section; a preprocessing execution result output section outputs an execution result of preprocessing performed on the image in part of the sequentially-arriving processing periods, the image having been acquired by the image acquiring section before the part of the sequentially-arriving processing periods; an execution result holding section keeps holding the execution result output by the preprocessing execution result output section at least until the execution result is output next time by the preprocessing execution result output section; and the image processing executing section executes the image processing by applying the execution result held in the execution result holding section to the image acquired by the image acquiring section.

8 Claims, 7 Drawing Sheets

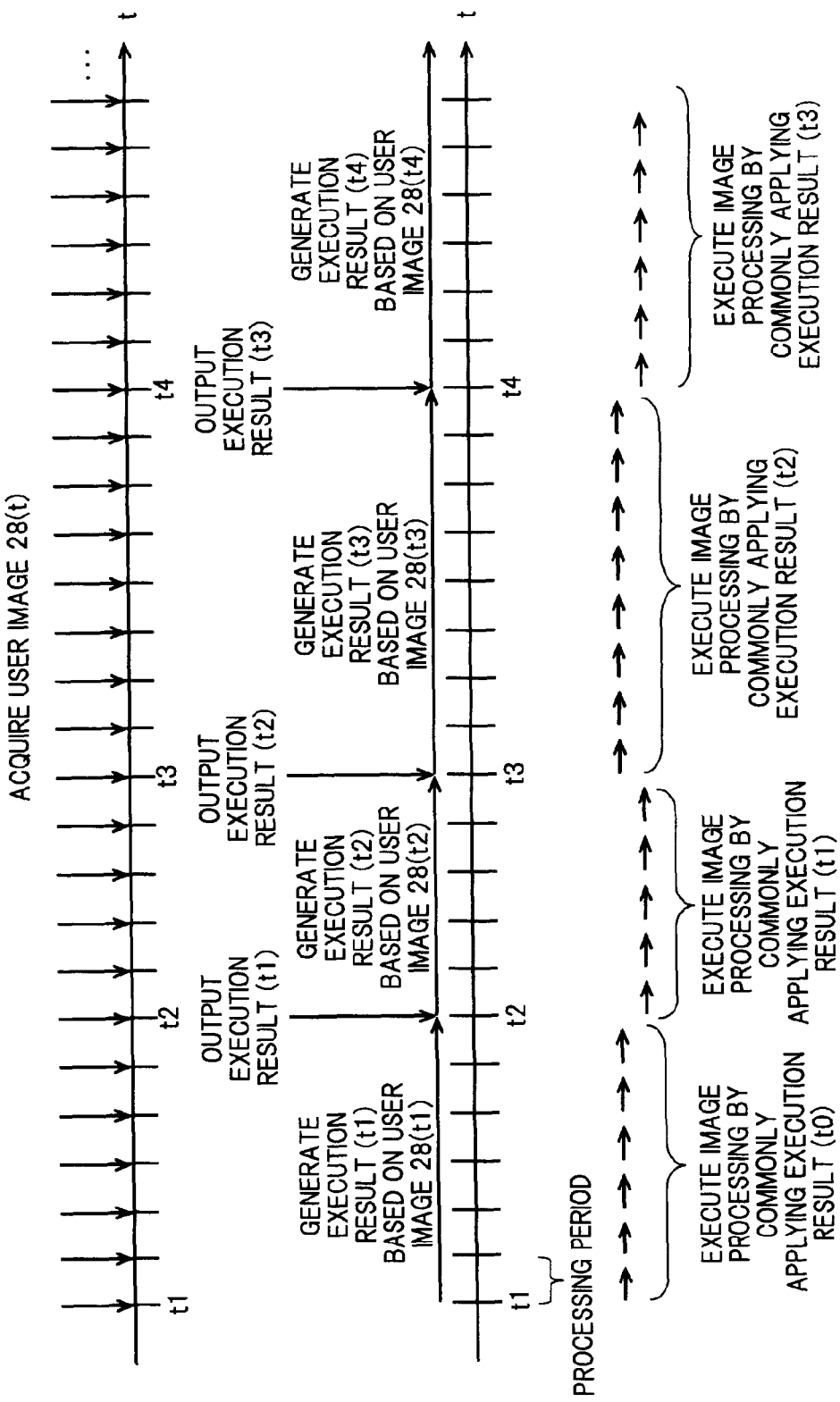

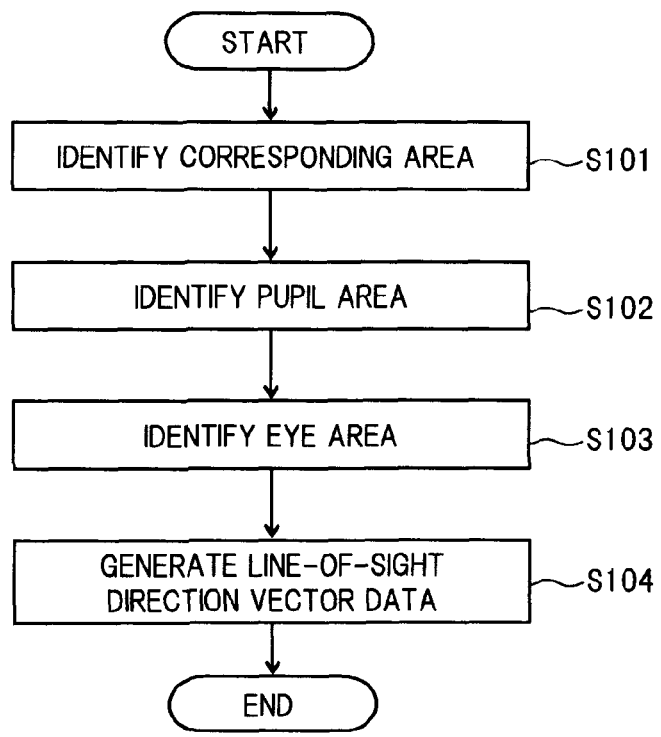
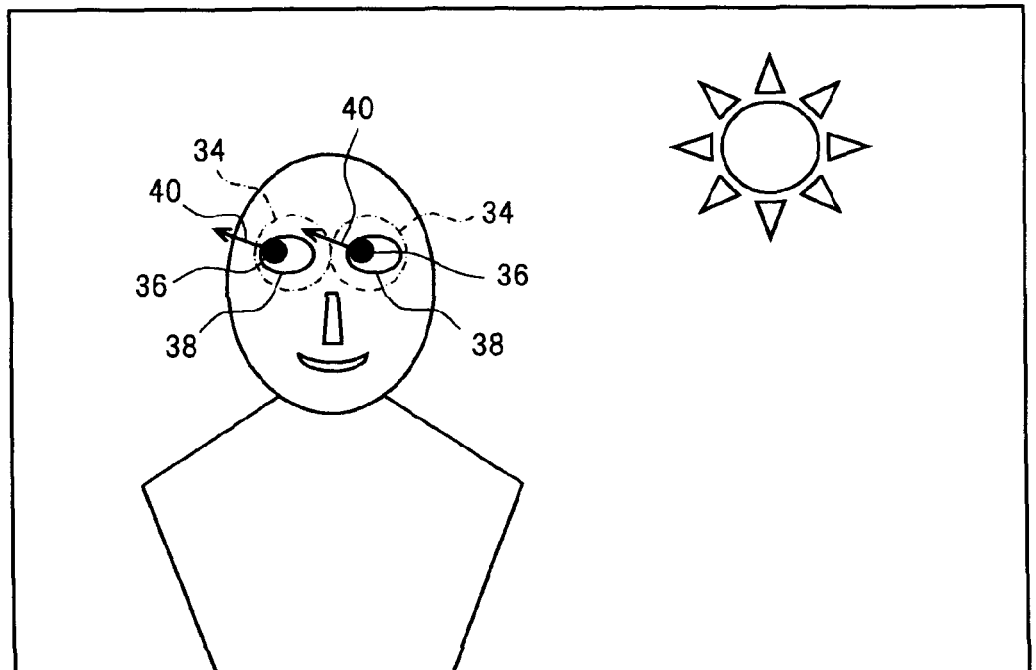

IMAGE PROCESSING DEVICE, IMAGE PROCESSING METHOD, AND INFORMATION STORAGE MEDIUM

TECHNICAL FIELD

The present invention relates to an image processing device, an image processing method, and an information storage medium.

BACKGROUND ART

An image processing device for identifying an area within an input image is known. Specifically, for example, Patent Document 1 discloses an image processing device capable of accurately tracking a predetermined body part such as an eye by using images different in resolution. In recent years, image recognition technologies for recognizing an area indicating a part such as a face, an eye, or a nose within an image showing a photographed person or the like by using a technique such as pattern matching are known as a technology for identifying an area within an image.

Patent Document 1: U.S. Pat. No. 6,714,660B

SUMMARY OF THE INVENTION

As another method of identifying an area within an image, a method of identifying an area based on a color of each pixel within an image is taken as an example. Specific examples thereof include a method of identifying an area of black pixels within an image as an area indicating an eye.

Here, by identifying the area within the image by combining a method based on an image recognition technology and the method based on the color of each pixel within the image, it is possible to identify the area within the image with higher accuracy than in a case of identifying the area within the image by using only one of those methods.

However, a time required for identifying the area within the image by the image recognition technology is longer than a time required for identifying the area within the image based on the color of each pixel within the image. Therefore, in the case of using a combination of the two methods, the time required for identifying the area within the image significantly increases in comparison with the case of solely using the method based on the color of each pixel within the image.

This generally applies to a case of obtaining an execution result of image processing by combining image processing that is executed in a short time but is low in precision and image processing that is high in precision but takes a long time.

The present invention has been made in view of the above-mentioned problem, and an object thereof is to provide an image processing device, an image processing method, and an information storage medium which can prevent a total processing time from significantly increasing while maintaining precision of image processing at a high level.

In order to solve the above-mentioned problem, an image processing device according to the present invention includes: image acquiring means for sequentially acquiring images generated by imaging a predetermined subject to be imaged; image processing executing means for executing, in each of sequentially-arriving processing periods, image processing on the image acquired by the image acquiring means; preprocessing execution result output means for outputting an execution result of preprocessing performed on the image in part of the sequentially-arriving processing periods, the image having been acquired by the image acquiring means before the part of the sequentially-arriving processing periods; and execution result holding means for keeping holding the execution result output by the preprocessing execution result output means at least until the execution result is output next time by the preprocessing execution result output means, in which the image processing executing means executes the image processing by applying the execution result held in the execution result holding means to the image acquired by the image acquiring means.

Further, an image processing method according to the present invention includes the steps of: sequentially acquiring images generated by imaging a predetermined subject to be imaged; executing, in each of sequentially-arriving processing periods, image processing on the image acquired in the step of acquiring; outputting an execution result of preprocessing performed on the image in part of the sequentially-arriving processing periods, the image having been acquired in the step of acquiring before the part of the sequentially-arriving processing periods; and keeping holding, in execution result holding means, the execution result output in the step of outputting at least until the execution result is output next time in the step of outputting, in which the step of executing includes executing the image processing by applying the execution result held in the execution result holding means to the image acquired in the step of acquiring.

Further, an information storage medium according to the present invention is a computer-readable information storage medium on which a program is stored, the program controlling a computer to function as: image acquiring means for sequentially acquiring images generated by imaging a predetermined subject to be imaged; preprocessing executing means for executing preprocessing on the image acquired by the image acquiring means; preprocessing execution result output means for outputting an execution result of the preprocessing; means for keeping holding, in execution result holding means, the execution result output by the preprocessing execution result output means at least until the execution result is output next time by the preprocessing execution result output means; and image processing executing means for executing image processing by applying the execution result held in the execution result holding means to the image acquired by the image acquiring means.

According to the present invention, the image processing executing means executes the image processing by applying the execution result of the preprocessing, which can produce an execution result by combining the preprocessing and the image processing. Further, according to the present invention, the image processing executing means executes the image processing by applying the execution result of the preprocessing held in the execution result holding means, which can prevent a significant increase in total processing time which may occur when the execution result is produced by combining the preprocessing and the image processing. Accordingly, according to the present invention, it is possible to prevent the total processing time from significantly increasing while maintaining the precision of the image processing at a high level.

According to one aspect of the present invention, the preprocessing execution result output means outputs the execution result of the preprocessing for identifying a reference color to be a reference used when the image processing is executed based on a color of at least one pixel within the image, and the image processing executing means executes the image processing for identifying a pixel within the image based on a comparison result between the reference color and the color of each pixel within the image. Accordingly, information on the color of the pixel within the image, which is identified by the preprocessing, can be used for the image processing.

Further, according to another aspect of the present invention, the preprocessing execution result output means outputs the execution result indicating an area within the image subjected to the image processing executed by the image processing executing means, the area corresponding to a position identified by the preprocessing for identifying the position within the image, and the image processing executing means executes the image processing for identifying a position within the area based on the area within the image indicated by the execution result. Accordingly, the image processing executing means identifies the position within the area within the image to be subjected to the image processing, which corresponds to the position within the image identified by the preprocessing, and hence information indicating the position within the image identified by the preprocessing can be used for the image processing for identifying the position within the image performed by the image processing executing means.

Further, in this aspect, the image processing executing means may identify a plurality of the positions within the area based on the area within the image indicated by the execution result, and execute the image processing for generating direction data indicating a direction based on a relationship among the plurality of the positions. Accordingly, it is possible to identify the direction within the image based on the image acquired by the image acquiring means.

Further, in this aspect, the area within the image subjected to the image processing executed by the image processing executing means, which is indicated by the execution result output by the preprocessing execution result output means, may have a size determined based on a size of an area identified by the preprocessing for identifying an area within the image. Accordingly, it is possible to determine the size of the area within the image to be subjected to the image processing based on a relationship with the area within the image to be subjected to the preprocessing.

BRIEF DESCRIPTION OF THE DRAWINGS

FIG. 4 is an explanatory diagram illustrating an example of a relationship between preprocessing and image processing.

FIG. 5 is a diagram illustrating an example of a flow of processing performed by the image processing device.

FIG. 6A is a diagram illustrating an example of the user image.

DETAILED DESCRIPTION OF THE PREFERRED EMBODIMENTS

Hereinafter, an embodiment of the present invention is described in detail with reference to the drawings.

Figure 1:
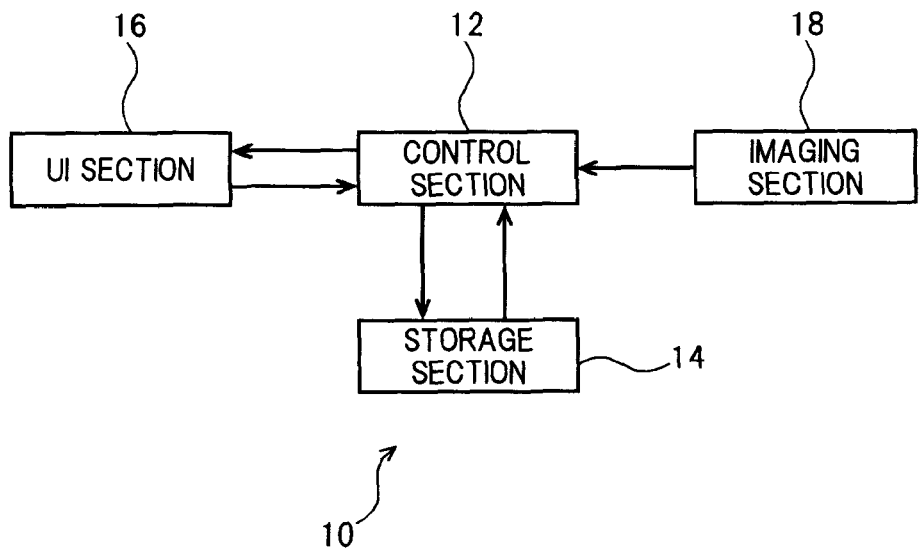
FIG. 1 is a diagram illustrating an example of a hardware configuration of an image processing device according to an embodiment of the present invention.

FIG. 1 is a hardware configuration diagram illustrating an example of a hardware configuration of an image processing device 10 according to this embodiment. As illustrated in FIG. 1, the image processing device 10 according to this embodiment includes a control section 12, a storage section 14, a user interface (UI) section 16, and an imaging section 18.

The control section 12 is a program control device such as a CPU, and operates according to a program stored in the storage section 14. Note that for example, the program can be stored on a computer-readable information transmission medium such as a CD-ROM and a DVD-ROM, and is supplied to the image processing device 10 via the information transmission medium or via a communication network such as the Internet.

The storage section 14 is a memory device such as a RAM, a hard disk drive, or the like. The program according to the present invention and the like, which are executed by the control section 12, are stored in the storage section 14. Further, the storage section 14 functions also as a work memory of the control section 12.

The UI section 16 represents a keyboard, a display, a mouse, and the like, and outputs contents of an operation performed by a user to the control section 12. Further, the UI section 16 outputs and displays information in response to an instruction input from the control section 12.

The imaging section 18 includes, for example, a known digital camera, and generates a black-and-white, grayscale, or color image (for example, JPEG-format image) every predetermined time (for example, 1/60 seconds).

Figure 2:
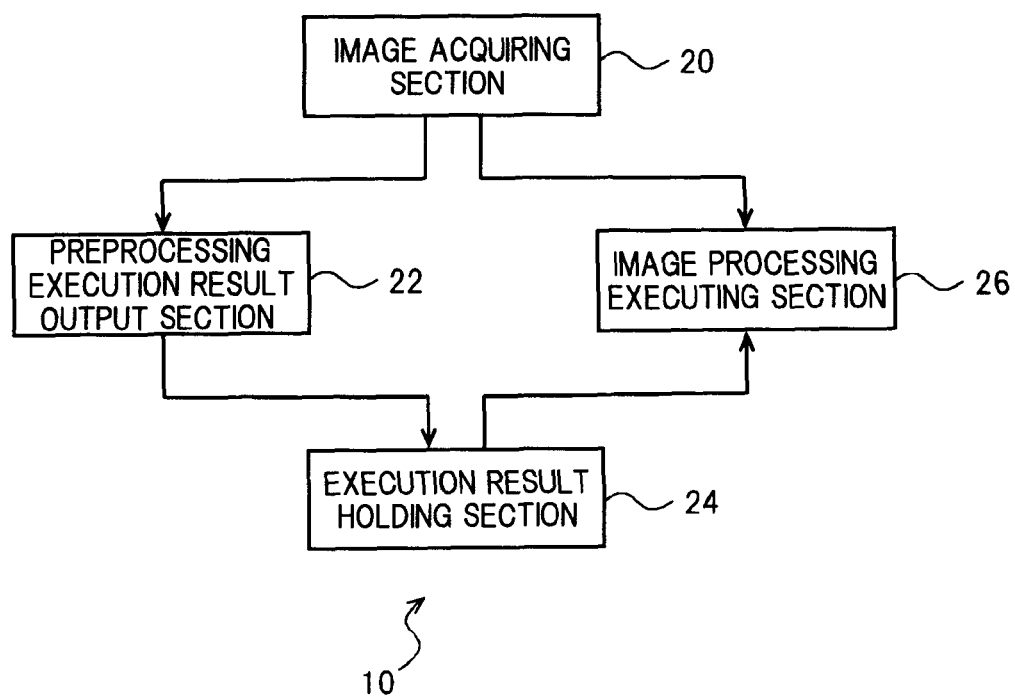
FIG. 2 is a functional block diagram of the image processing device according to the embodiment of the present invention.

FIG. 2 is a functional block diagram of the image processing device 10 according to this embodiment. As illustrated in FIG. 2, the image processing device 10 according to this embodiment functionally includes an image acquiring section 20, a preprocessing execution result output section 22, an execution result holding section 24, and an image processing executing section 26. Those functions are implemented by the control section 12, the storage section 14, the UI section 16, or the imaging section 18 of the image processing device 10.

Figure 3:
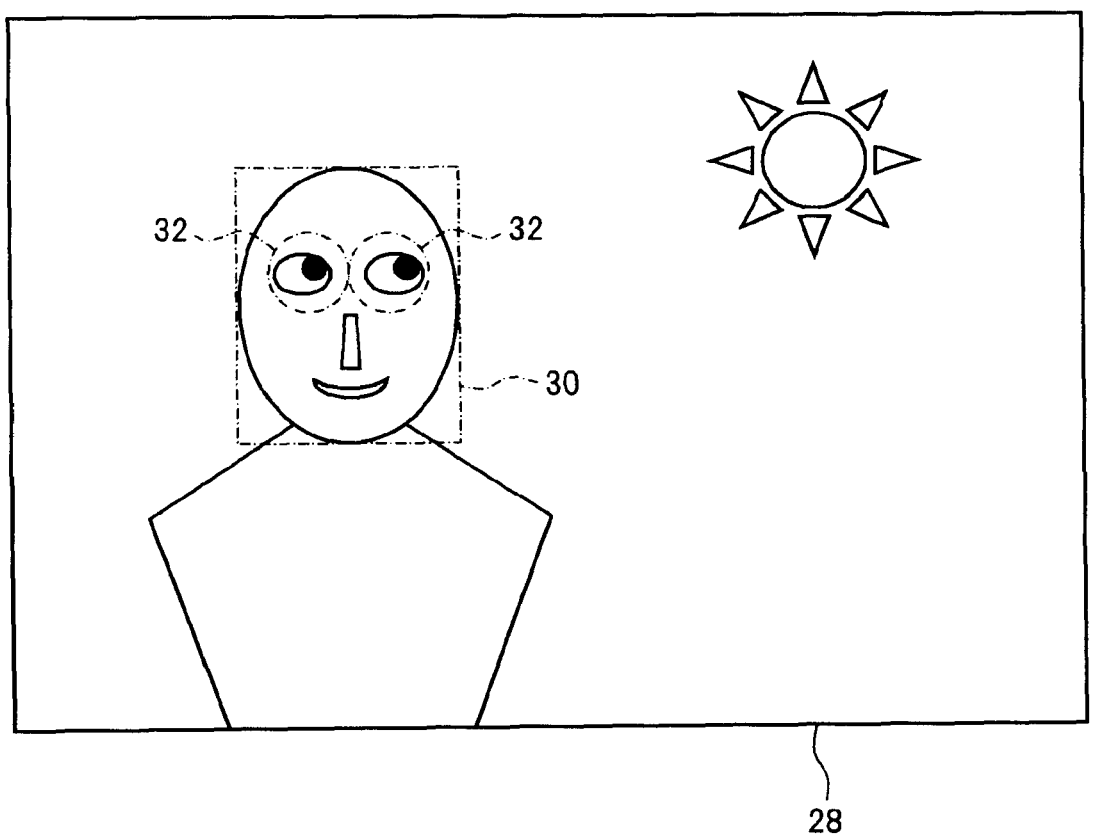
FIG. 3 is a diagram illustrating an example of a user image.

The image acquiring section 20 sequentially acquires images generated by imaging a predetermined subject to be imaged. In this embodiment, the imaging section 18 generates a user image 28 showing a user as illustrated in FIG. 3 every predetermined time. Then, the image acquiring section 20 sequentially acquires the user images 28 taken by the imaging section 18. Note that the imaging section 18 does not need to generate an image periodically. Further, the image acquiring section 20 does not need to acquire an image periodically. Note that the image acquiring section 20 may sequentially write the acquired images into the storage section 14.

The preprocessing execution result output section 22 outputs an execution result of preprocessing performed on the image in part of processing periods, the image having been acquired by the image acquiring section 20 before the part of the processing periods. Note that details of the processing period are described later. In this embodiment, the preprocessing execution result output section 22 also executes the preprocessing in addition to the outputting of the execution result. Note that an external device connected to the image processing device according to this embodiment may execute the preprocessing, and the preprocessing execution result output section 22 may output an execution result thereof. The preprocessing executed by the preprocessing execution result output section 22 according to this embodiment specifically includes: processing for recognizing positions of a pupil, a face, a nose, and a mouth from an image (user image 28 in this embodiment) by using a known pattern recognition technology, face recognition technology, and the like; and processing for judging a color of a pixel in the recognized position.

The execution result holding section 24 keeps holding the execution result output by the preprocessing execution result output section 22 at least until the execution result is output next time by the preprocessing execution result output section 22. Specific examples of the execution result held by the execution result holding section 24 according to this embodiment include position data indicating the positions of the pupil, the face, the nose, and the mouth within the user image 28, which are recognized by the preprocessing, and color data indicating the color of the pixel in the recognized position. Further, the execution result holding section 24 may hold a most recent execution result output by the preprocessing execution result output section 22. In this case, the execution result holding section 24 may delete an execution result that is output by the preprocessing execution result output section 22 but is not the most recent execution result.

During each of sequentially-arriving processing periods, the image processing executing section 26 executes image processing by applying the execution result held in the execution result holding section 24 to the image (user image 28 in this embodiment) acquired by the image acquiring section 20. In this embodiment, the processing period specifically represents a period from a time point when image processing is executed by the image processing executing section 26 until a time point when the next image processing is executed by the image processing executing section 26. Note that the processing period is not limited to the above-mentioned period. For example, the processing period may represent a period from a time point when an image is acquired by the image acquiring section 20 until a time point when the next image is acquired by the image acquiring section 20.

Note that the processing period may be set to sequentially arrive each time the image is acquired by the image acquiring section 20. Further, the processing period may be set to sequentially arrive each time the image is acquired by the image acquiring section 20 a predetermined number of times (for example, twice).

In this embodiment, the image processing executed by the image processing executing section 26 specifically represents image processing for identifying a pixel of a specific color and an area containing the pixel, based on the color of each pixel within the user image 28.

Here, a relationship between the preprocessing and the image processing according to this embodiment is described with reference to FIG. 4. FIG. 4 is an explanatory diagram illustrating an example of the relationship between preprocessing and the image processing.

As illustrated in FIG. 4, in this embodiment, the image acquiring section 20 acquires the user image 28 every predetermined time (for example, 1/60 seconds).

In this embodiment, the preprocessing execution result output section 22 uses the known pattern recognition technology, face recognition technology, and the like to recognize the position of the pupil and the position of a face area 30 indicating the face from a user image 28 (user image 28 (t1)) acquired by the image acquiring section 20 at a time instant t1 (see FIG. 3). Here, the preprocessing execution result output section 22 may recognize the position of the nose, the position of the mouth, and the like together.

Here, the preprocessing execution result output section 22 may output reference color data based on the color of at least one pixel within the image to be subjected to the preprocessing, the reference color data being the execution result of the preprocessing for identifying a reference color to be a reference used when the image processing executing section 26 executes the image processing. In this embodiment, specifically, for example, the preprocessing execution result output section 22 generates pupil color data indicating the color of the pixel in the position of the pupil. In addition, the preprocessing execution result output section 22 selects a pixel within the face area 30 to generate face color data indicating the color of the pixel. In a case where the position of the nose is recognized, the preprocessing execution result output section 22 may identify the color indicated by the face color data based on the color of the pixel in the position of the nose. Accordingly, in this embodiment, the preprocessing execution result output section 22 outputs two items of reference color data (pupil color data and face color data).

Then, in this embodiment, the preprocessing execution result output section 22 calculates a focus area 32 having a circular shape with the position of the pupil as its center based on the recognized position of the pupil, and generates focus area position data indicating the position of the focus area 32 within the user image 28 (see FIG. 3). Note that the focus area 32 does not need to have a circular shape and may have, for example, a rectangular shape. In addition, a different position within the image from the position within the image identified by the preprocessing may be identified in the image processing performed by the image processing executing section 26. Further, the preprocessing execution result output section 22 may identify the area within the image by the preprocessing, and output the execution result indicating such an area within the image to be subjected to the image processing as to correspond to the above-mentioned area and to have a size larger than the above-mentioned area. Further, the preprocessing execution result output section 22 may determine the size of the focus area 32 based on the size of the face area 30. Thus, the size of the area within the image to be subjected to the image processing executed by the image processing executing section 26, which is indicated by the execution result output by the preprocessing execution result output section 22, may be determined based on the size of the area identified by the preprocessing for identifying the area within the image.

Then, in this embodiment, the preprocessing execution result output section 22 outputs an execution result (execution result (t1)) to the execution result holding section 24 at a time instant t2, the execution result (t1) being generated based on the user image 28 acquired by the image acquiring section 20 at the time instant t1 and including the focus area position data, the pupil color data, and the face color data. Note that as described later, the focus area 32 indicated by the focus area position data corresponds to the area within the user image 28 to be subjected to the image processing executed by the image processing executing section 26. Thus, the preprocessing execution result output section 22 may output the execution result indicating the area within the image to be subjected to the image processing executed by the image processing executing section 26, which corresponds to the position identified by the preprocessing for identifying the position within the image. Note that the preprocessing execution result output section 22 may execute the above-mentioned preprocessing during all the time between the time instant t1 and the time instant t2. Further, the above-mentioned preprocessing may be completed between the time instant t1 and the time instant t2, and the execution results may be output to the execution result holding section 24 at the time instant t2. Then, the execution result holding section 24 holds the execution result output by the preprocessing execution result output section 22.

Then, the preprocessing execution result output section 22 executes the above-mentioned preprocessing based on a user image 28 (user image 28 (t2)) acquired by the image acquiring section 20 at the time instant t2, and outputs an execution result (execution result (t2)) including the focus area position data, the pupil color data, and the face color data to the execution result holding section 24 at a time instant t3. Then, the preprocessing execution result output section 22 executes the above-mentioned preprocessing based on a user image 28 (user image 28 (t3)) acquired by the image acquiring section 20 at the time instant t3, and outputs an execution result (execution result (t3)) including the focus area position data, the pupil color data, and the face color data to the execution result holding section 24 at a time instant t4. Thus, the preprocessing execution result output section 22 sequentially outputs the execution results to the execution result holding section 24. In this embodiment, intervals at which the preprocessing execution result output section 22 outputs the execution results do not need to be regular intervals as illustrated in FIG. 4. Note that the preprocessing execution result output section 22 may output the execution results at predetermined intervals longer than the intervals at which the image acquiring section 20 acquires the images.

Then, in this embodiment, the image processing executing section 26 executes the image processing by, for example, applying the execution result output to the execution result holding section 24 by the preprocessing execution result output section 22 based on the user image 28 (user image 28 (t1)) acquired by the image acquiring section 20 at the time instant t1, that is, the execution result (execution result (t1)) held in the execution result holding section 24 between the time instant t2 and the time instant t3, to the user images 28 acquired by the image acquiring section 20 which range from the user image (user image 28 (t2)) acquired by the image acquiring section 20 at the time instant t2 to the user image immediately before the user image (user image 28 (t3)) acquired by the image acquiring section 20 at the time instant t3. In the same manner, the image processing executing section 26 executes the image processing by applying the execution result output to the execution result holding section 24 by the preprocessing execution result output section 22 based on the user image 28 acquired by the image acquiring section 20 at the time instant t2, that is, the execution result (execution result (t2)) held in the execution result holding section 24 between the time instant t3 and the time instant t4, to the user images 28 acquired by the image acquiring section 20 which range from the user image (user image 28 (t3)) acquired by the image acquiring section 20 at the time instant t3 to the user image immediately before the user image (user image 28 (t4)) acquired by the image acquiring section 20 at the time instant t4. Further, the image processing executing section 26 executes the image processing by applying the execution result output to the execution result holding section 24 by the preprocessing execution result output section 22 based on the user image 28 acquired by the image acquiring section 20 at the time instant t3, that is, the execution result (execution result (t3)) held in the execution result holding section 24 after the time instant t4, to images (image (t4) and the subsequent images) acquired by the image acquiring section 20 at or after the time instant t4.

Note that with regard to a time point before the time instant t2, the image processing executing section 26 executes the image processing by applying an execution result (execution result (t0)) output to the execution result holding section 24 by the preprocessing execution result output section 22 based on the user image 28 acquired by the image acquiring section 20 at a time instant t0 before the time instant t1.

Accordingly, in each of the sequentially-arriving processing periods, the image processing executing section 26 executes the image processing by applying the execution result held in the execution result holding section 24 to the image acquired by the image acquiring section 20. Thus, the execution result held in the execution result holding section 24 may be used a plurality of times for the image processing executed by the image processing executing section 26.

As in the above-mentioned example, the execution result generated based on the image acquired by the image acquiring section 20 may be output to the execution result holding section 24 by the preprocessing execution result output section 22, and the image processing may be executed by applying the execution result held in the execution result holding section 24 to images acquired by the image acquiring section 20 after the former image is acquired. That is, the user image 28 to be subjected to the image processing may differ from the user image 28 serving as a basis of the execution result of the preprocessing which is applied to the former user image 28. Note that the same image acquired by the image acquiring section 20 may be continuously subjected to the preprocessing and the image processing.

In this embodiment, the image processing executing section 26 executes image processing for generating line-of-sight direction vector data described later. Here, the flowchart illustrated in FIG. 5 is referenced to describe an example of a flow of the image processing of this embodiment performed in each of the sequentially-arriving processing periods until the line-of-sight direction vector data is generated based on the user image 28 acquired by the image acquiring section 20. Here, FIG. 6A illustrates an example of the user image 28 to be subjected to the image processing performed by the image processing executing section 26.

First, the image processing executing section 26 identifies a corresponding area 34 corresponding to the position of the focus area 32 within the user image 28 acquired by the image acquiring section 20, the focus area 32 being indicated by the focus area position data held in the execution result holding section 24 (S101).

Then, the image processing executing section 26 identifies a pixel within the corresponding area 34 in which a pupil is displayed by comparing the color of each pixel within the corresponding area 34 and a color indicated by the pupil color data held in the execution result holding section 24. Then, the image processing executing section 26 identifies a pupil area 36 within the corresponding area 34 in which the pupil is displayed based on the identified pixel (S102). Thus, the image processing executing section 26 may identify the pixel within the image (in this embodiment, corresponding area 34) based on the result of comparing the reference color (color indicated by the pupil color data in this embodiment) and the color of each pixel within the image (in this embodiment, corresponding area 34). Further, when the preprocessing execution result output section 22 outputs the execution result indicating the area (in this embodiment, corresponding area 34) within the image to be subjected to the image processing executed by the image processing executing section 26, the image processing executing section 26 may identify, based on the area (in this embodiment, corresponding area 34) within the image indicated by the above-mentioned execution result, a position (in this embodiment, pupil area 36) within the above-mentioned area.

In this embodiment, the user image 28 to be subjected to the preprocessing performed by the preprocessing execution result output section 22, which is illustrated in FIG. 3, and the user image 28 to be subjected to the image processing performed by the image processing executing section 26, which is illustrated in FIG. 6A, are different from each other in the timing at which the user image 28 is acquired by the image acquiring section 20, and hence different from each other in the position within the image in which the user's pupil is displayed. Irrespective thereof, the preprocessing execution result output section 22 outputs the execution result indicating the area within the image to be subjected to the image processing which includes the area identified by the preprocessing and which has a size larger than the area, and hence the image processing executing section 26 can identify the position within the image in which the user's pupil is displayed.

Further, in this embodiment, pixels in which eyes (here, pupils and whites) are displayed are identified by removing pixels of a color corresponding to the color indicated by the face color data from the pixels within the corresponding area based on the comparison between the color of each pixel within the corresponding area and the color indicated by the face color data held in the execution result holding section 24. Then, the image processing executing section 26 identifies an eye area 38 within the corresponding area in which the eye is displayed based on the identified pixels (S103).

Figure 6B:
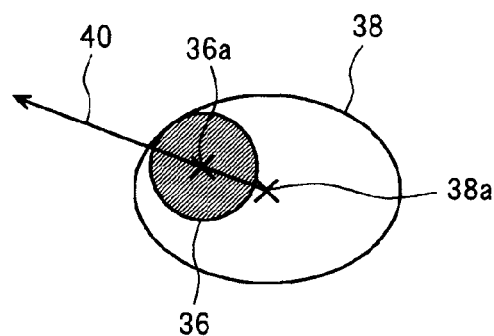
FIG. 6B is a diagram illustrating an example of a state in which an eye area within the user image is enlarged.

Then, the image processing executing section 26 generates the line-of-sight direction vector data representing a line-of-sight direction 40 within the image, which is directed from the barycenter of the eye area 38 (eye area barycenter 38a) toward the barycenter of the pupil area 36 (pupil area barycenter 36a) (S104) (see FIG. 6B). Note that FIG. 6B is a diagram illustrating an example of a state in which the eye area 38 within the user image 28 illustrated in FIG. 6A is enlarged. Thus, the image processing executing section 26 may identify, based on the area within the image to be subjected to the image processing by the image processing executing section 26, which is indicated by the execution result output by the preprocessing execution result output section 22, a plurality of positions within the above-mentioned area, and may generate direction data indicating a direction based on a relationship among those plurality of positions. In this case, the barycenter of the eye area 38 and the barycenter of the pupil area 36 may be calculated in units finer than the units of the size of the pixel. Note that data serving as a basis on which the image processing executing section 26 generates the line-of-sight direction vector data is not limited to the pupil area barycenter 36a or the eye area barycenter 38a.

Thus, in this embodiment, the direction data is generated. Note that the image processing executed by the image processing executing section 26 is not limited to the image processing for generating the direction data. For example, the image processing executing section 26 may execute the image processing for identifying the area within the image.

Note that the image processing executing section 26 may execute additional image processing by using the direction data generated by the image processing executing section 26 and the pixel or the area within the image identified by the image processing executing section 26. Note that in this case, the additional image processing may be executed on an image different from the image to be subjected to the above-mentioned preprocessing or image processing.

Figure 7:
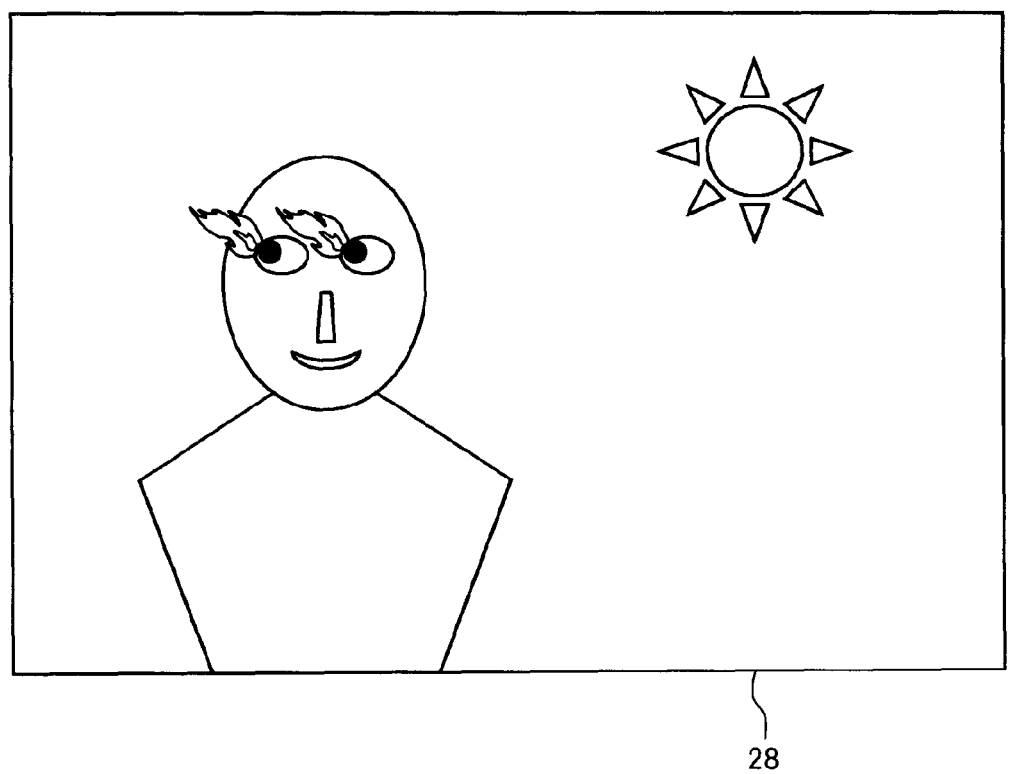
FIG. 7 is a diagram illustrating an example of the user image.

Specifically, for example, the image processing executing section 26 may perform such image processing as to superpose an image of a flame on the pupil area 36 within the image to thereby apply such a visual effect as to cause the eye to emit a flame to the image, and the image may be output to the UI section 16 such as the display. Further, for example, as illustrated in FIG. 7, the image processing executing section 26 may apply such a visual effect as to cause the eye to emit a flame in the line-of-sight direction 40 to the image based on the line-of-sight direction 40 within the user image 28 indicated by the line-of-sight direction vector data, and the image may be output to the UI section 16 such as the display.

Figure 8A:
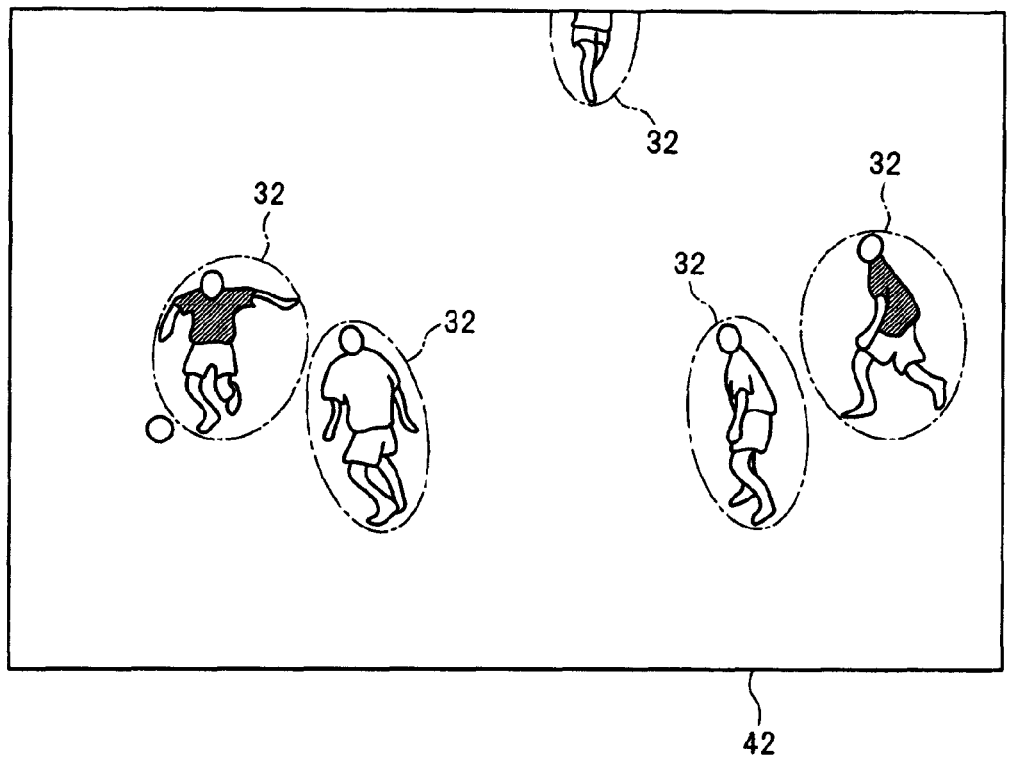
FIG. 8A is a diagram illustrating an example of a field image.
Figure 8B:
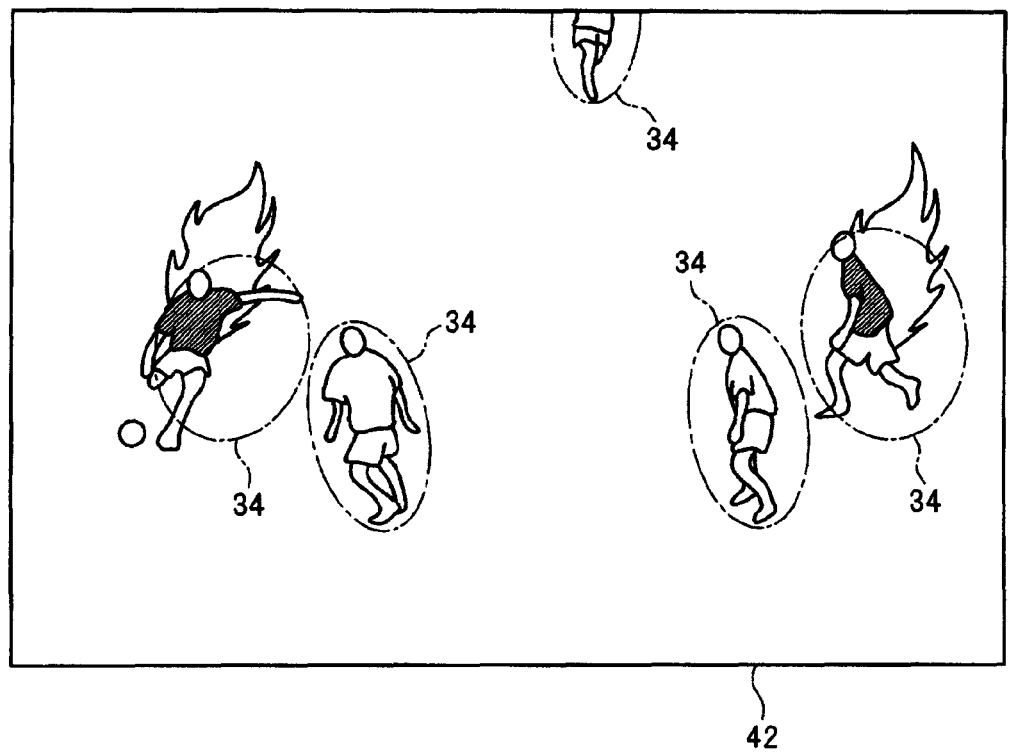
FIG. 8B is a diagram illustrating an example of the field image.

As an applied example of the above-mentioned image processing, such a visual effect as to cause players of a specific team to emit flames may be applied to a field image 42 showing a soccer field illustrated in, for example, FIGS. 8A and 8B, and the field image 42 may be output to the UI section 16 such as the display.

Specifically, for example, the preprocessing execution result output section 22 recognizes a position of a person from the field image 42 acquired by the image acquiring section 20, which is illustrated in FIG. 8A, by using the known pattern recognition technology, person recognition technology, and the like. In this case, as illustrated in FIG. 8A, the preprocessing execution result output section 22 may recognize positions of a plurality of persons. Then, the preprocessing execution result output section 22 calculates the focus area 32 having an oval shape with the position of the person as its center based on the recognized position of the person, and generates the focus area position data indicating the position of the focus area 32 within the field image 42. Then, the preprocessing execution result output section 22 outputs the generated focus area position data to the execution result holding section 24.

Then, the image processing executing section 26 identifies the corresponding area 34 corresponding to the position of the focus area 32 which is illustrated in FIG. 8B within the field image 42 acquired by the image acquiring section 20 after the field image 42 subjected to the preprocessing is acquired by the image acquiring section 20, the focus area 32 being indicated by the focus area position data held in the execution result holding section 24. Then, the image processing executing section 26 identifies the pixel within the corresponding area 34 in which a uniform is displayed by comparing the color of each pixel within the corresponding area 34 and a predetermined color of the uniform. Then, the image processing executing section 26 identifies a uniform area 44 within the corresponding area 34 in which the uniform is displayed based on the identified pixel.

Figure 8C:
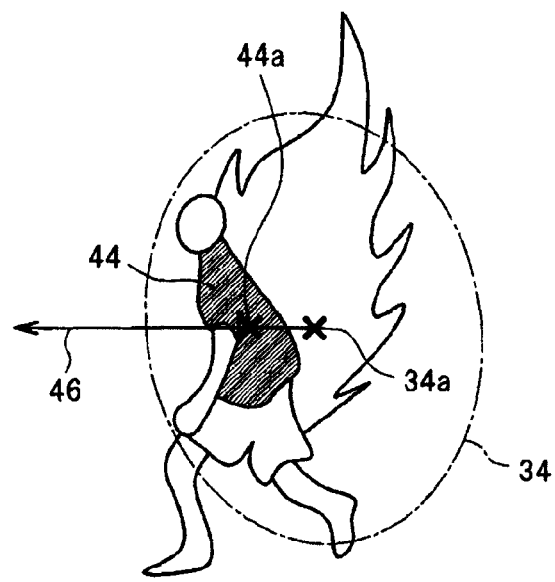
FIG. 8C is a diagram illustrating an example of a state in which a corresponding area within the field image is enlarged.

Then, the image processing executing section 26 generates moving direction vector data indicating a direction (moving direction 46) from the barycenter of the corresponding area 34 (corresponding area barycenter 34a) toward the barycenter of the uniform area 44 (uniform area barycenter 44a) (see FIG. 8C). Note that FIG. 8C is a diagram illustrating an example of a state in which the corresponding area 34 within the field image is enlarged. Then, the image processing executing section 26 applies such a visual effect as to cause a flame to be emitted in a direction reverse to the moving direction 46 to the field image 42.

In the above-mentioned processing, a time point at which the field image 42 to be subjected the image processing executed by the image processing executing section 26 is acquired is later than a time point at which the field image 42 subjected to the preprocessing executed by the preprocessing execution result output section 22 is acquired. Therefore, it is possible to handle the moving direction 46 indicated by the moving direction vector data as a direction in which the person such as a soccer player is moving and to apply such a visual effect as to cause a flame to be emitted in the direction reverse to the moving direction 46. Note that data serving as a basis on which the image processing executing section 26 generates the moving direction vector data is not limited to the corresponding area barycenter 34*a* or the uniform area barycenter 44*a*.

Figure 9:
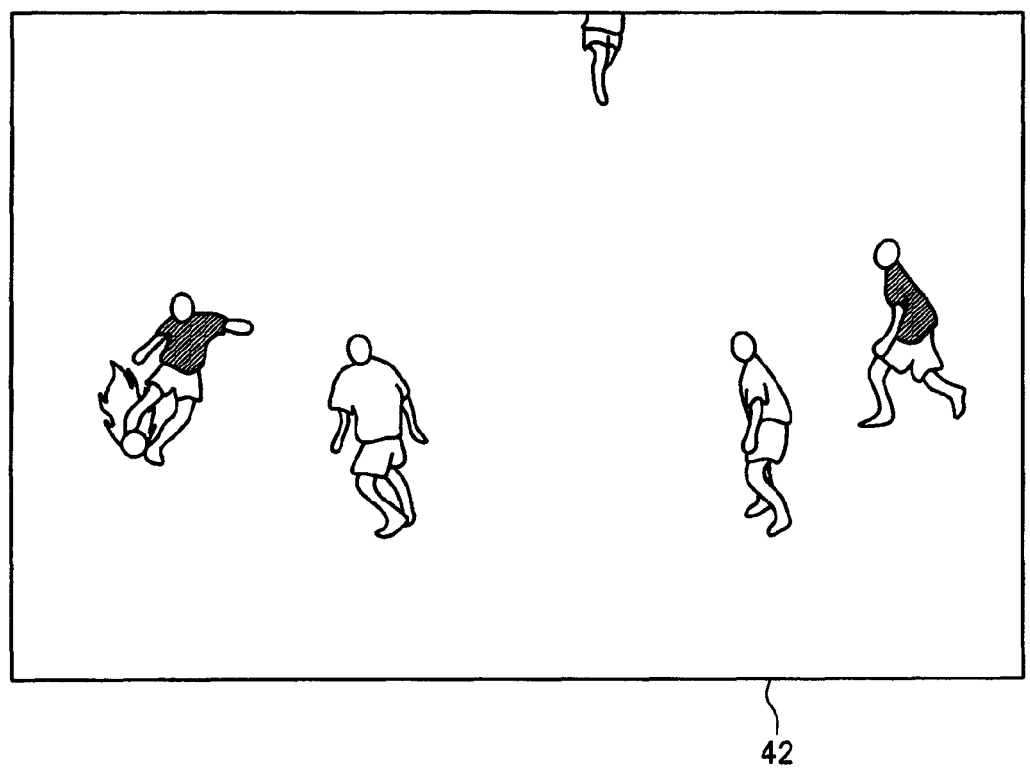
FIG. 9 is a diagram illustrating an example of the field image.

Further, by a method similar to the above-mentioned method, as illustrated in FIG. 9, the above-mentioned image processing may be performed on a series of field images 42 that form a moving image taken in a soccer live broadcast to thereby apply thereto, for example, such a visual effect as to cause a ball to emit a flame, and the field images 42 may be output to the UI section 16 such as the display.

Note that naturally, a visual effect other than such a visual effect as to cause a flame to be emitted may be applied to the moving image, and the moving image may be output to the UI section 16 such as the display. Thus, for example, the image processing executing section 26 may execute the image processing on the series of images acquired by the image acquiring section 20 in the above-mentioned processing flow, apply the visual effect to each of the images, and output those images to the UI section 16 such as the display. Further, the image processing executing section 26 may generate the moving image by combining a plurality of images to which the visual effect is applied, and output the moving image to the UI section 16 such as the display.

Further, information processing other than the image processing may be executed by using the direction data generated by the image processing executing section 26 and the pixel or the area within the image identified by the image processing executing section 26. Specifically, for example, in a case where the image processing device 10 according to this embodiment is applied to a game device, it is conceivable to change an operation of a game based on the line-of-sight direction 40 within the user image 28 which is indicated by the line-of-sight direction vector data.

According to this embodiment, the preprocessing execution result output section 22 can identify the focus area 32 within the image showing the user, which is acquired by the image acquiring section 20, by using the known pattern recognition technology, face recognition technology, and the like, and the image processing executing section 26 can identify the pupil area 36 indicating the user's pupil with high precision by identifying the pupil area 36 within the focus area 32.

In addition, by applying the execution result which is output by the preprocessing execution result output section 22 and held in the execution result holding section 24, when the image processing executing section 26 identifies the pupil area 36, it is possible to reduce a total processing time required for the image processing to a lower level than in the case where the execution of the image processing for identifying the focus area 32 within the image showing the user is followed by the execution of the image processing for identifying the pupil area 36 within the focus area 32 with respect to the resultant image. Therefore, irrespective of the execution of the image processing by combining the two methods, it is possible to prevent a significant increase in total time required for the image processing in comparison with the case of executing the image processing based on the color of each pixel within the image.

Accordingly, according to this embodiment, it is possible to prevent the total processing time from significantly increasing while maintaining precision of the image processing at a high level. Further, according to this embodiment, without waiting until the execution result of the preprocessing is output, the image processing executing section 26 can execute the image processing by using the execution result held in the execution result holding section 24. In addition, in a case where a long time is required for executing the preprocessing on the image or in a case where a time necessary to execute the preprocessing on the image exhibits a wide range of variation, it is possible to particularly suppress an influence exerted upon the total time required for the image processing.

Note that the present invention is not limited to the above-mentioned embodiment.

For example, the preprocessing execution result output section 22 may generate an image resulting from the preprocessing based on the image acquired by the image acquiring section 20. Then, the image processing executing section 26 may generate an image resulting from the image processing based on the image acquired by the image acquiring section 20. In this case, the image processing executing section 26 may execute the image processing on the entire image acquired by the image acquiring section 20, and based on a result thereof, may generate the image resulting from the image processing. Then, the image processing executing section 26 may execute the image processing for identifying the pixel or the area within the image acquired by the image acquiring section 20 based on the image resulting from the preprocessing and the image resulting from the image processing.

A specific example of the above-mentioned processing is described hereinbelow.

First, the preprocessing execution result output section 22 generates a binary image resulting from the preprocessing in which the inside of the focus area 32 is distinguished from the outside of the focus area 32 (more specifically, binary image resulting from the preprocessing having the same size as the user image 28, in which, for example, the pixel inside the focus area 32 is displayed in black and the pixel outside the focus area 32 is displayed in white) based on the user image 28 acquired by the image acquiring section 20 at the time instant t1, and outputs the binary image to the execution result holding section 24 at the time instant t2.

Then, the image processing executing section 26 executes processing for identifying a pixel in which a predetermined color (for example, color of a pupil) is displayed on the entire user image 28 acquired by the image acquiring section 20 at the time instant t2, and generates a binary image resulting from the image processing in which the identified pixels are distinguished from the other pixels (more specifically, binary image resulting from the image processing having the same size as the user image 28, in which, for example, the identified pixels are displayed in black and the other pixels are displayed in white).

Then, the image processing executing section 26 generates a mask image having the same size as the user image 28, in which mask pixels are distinguished from the other pixels by, for example, superposition calculation between the binary image resulting from the preprocessing held in the execution result holding section 24 and the binary image resulting from the image processing generated by the above-mentioned processing. Specifically, for example, the image processing executing section 26 generates the mask image having the same size as the user image 28, in which the mask pixels are displayed in black and the other pixels are displayed in white, the mask pixels being pixels that are displayed in black both in the binary image resulting from the preprocessing and in the binary image resulting from the image processing.

Then, the image processing executing section 26, for example, superposes the mask image on the user image 28 serving as a basis on which the binary image resulting from the image processing is generated (user image 28 acquired by the image acquiring section 20 at the time instant t2), and applies, for example, such a visual effect as to cause a flame to be emitted to mask pixels within the superposed image.

Note that in the above-mentioned processing example, the image processing executing section 26 generates the binary image resulting from the image processing based on the user image 28 acquired by the image acquiring section 20 at the time instant t2, but may naturally generate the binary image resulting from the image processing based on the user image 28 acquired by the image acquiring section 20 at or after the time instant t2. Further, in the above-mentioned processing example, the mask image and the user image 28 have the same size, but the user image 28 and the mask image do not need to have the same size.

Further, in the above-mentioned processing example, the preprocessing execution result output section 22 may output the reference color data (for example, pupil color data and face color data) to the execution result holding section 24, and the image processing executing section 26 may generate the binary image resulting from the image processing by executing the processing for identifying the pixel in which the color indicated by the reference color data held in the execution result holding section 24 is displayed.

Further, in the above-mentioned processing example, the image processing executing section 26 may generate a plurality of binary images resulting from the image processing each of which corresponds to a different color, and may generate a plurality of mask images based on those binary images resulting from the image processing.

Note that the present invention is not limited to the above-mentioned embodiment, either.

For example, the execution result of the preprocessing output by the preprocessing execution result output section 22 may be determined based on the time required for the execution of the preprocessing. Specifically, for example, the size of the focus area 32 may be determined based on the time required for the execution of the preprocessing.

Further, for example, a resolution of the image used for the preprocessing may differ from a resolution of the image used for the image processing. Further, for example, the imaging section 18 may take the image used for the image processing by zooming in from the image used for the preprocessing.

Further, for example, the image processing device 10 may include two imaging sections 18, and the image acquiring section 20 may acquire the image used for the preprocessing and the image used for the image processing from the different imaging sections 18. In this case, for example, the image processing device 10 may include a wide-angle camera and a high frame rate camera, the preprocessing execution result output section 22 may output the execution result obtained by executing the preprocessing on the image taken by the wide-angle camera to the execution result holding section 24, and the image processing executing section 26 may execute the image processing by applying the execution result held in the execution result holding section 24 to the image taken by the high frame rate camera. Further, the image processing device 10 including a wide-angle camera (specifically, for example, stationary game device) and the image processing device 10 including a high frame rate camera (specifically, for example, portable game device) may cooperate with each other to execute the above-mentioned series of image processing.

Further, for example, the imaging section 18 may take the image used for the image processing with a shift from the focus area 32 toward the line-of-sight direction 40 indicated by the line-of-sight direction vector data.

Further, for example, the line-of-sight direction vector data may be generated based on distortion of the eye area 38. Further, the line-of-sight direction vector data may be estimated based on a proportion of the pupil area 36 indicated in the eye area 38 thereto.

Further, the image processing device 10 may be formed of one casing or may be formed of a plurality of casings. Further, the image processing device 10 may include a communication section instead of the imaging section 18, to thereby communicate with the imaging section 18 outside the image processing device 10 which has a communication function.

The invention claimed is:

1. An image processing device, comprising:
    image acquiring means for sequentially acquiring images generated by imaging a predetermined subject to be imaged;
    image processing executing means for executing, in each of sequentially-arriving processing periods, image processing on the image acquired by the image acquiring means;
    preprocessing execution result output means for outputting an execution result of preprocessing performed on the image in part of the sequentially-arriving processing periods, the image having been acquired by the image acquiring means before the part of the sequentially-arriving processing periods; and
    execution result holding means for keeping holding the execution result output by the preprocessing execution result output means at least until the execution result is output next time by the preprocessing execution result output means, wherein
    the image processing executing means executes the image processing by applying the execution result held in the execution result holding means to the image acquired by the image acquiring means, and
    after the execution result of preprocessing performed in parallel with the image processing during the execution of the image processing by applying the execution result held in the execution result holding means is output to the execution result holding means by the preprocessing execution result output means, the image processing executing means executes the image processing by applying the output execution result multiple times until the next execution result of preprocessing is output to the execution result holding means by preprocessing execution result output means.

2. The image processing device according to claim 1, wherein:
    the preprocessing execution result output means outputs the execution result of the preprocessing for identifying a reference color to be a reference used when the image processing is executed based on a color of at least one pixel within the image; and
    the image processing executing means executes the image processing for identifying a pixel within the image based on a comparison result between the reference color and the color of each pixel within the image.

3. The image processing device according to claim 1, wherein:
    the preprocessing execution result output means outputs the execution result indicating an area within the image subjected to the image processing executed by the image processing executing means, the area corresponding to a position identified by the preprocessing for identifying the position within the image; and the image processing executing means executes the image processing for identifying a position within the area based on the area within the image indicated by the execution result.

4. The image processing device according to claim 3, wherein the image processing executing means identifies a plurality of the positions within the area based on the area within the image indicated by the execution result, and executes the image processing for generating direction data indicating a direction based on a relationship among the plurality of the positions.

5. The image processing device according to claim 3, wherein the area within the image subjected to the image processing executed by the image processing executing means, which is indicated by the execution result output by the preprocessing execution result output means, has a size determined based on a size of an area identified by the preprocessing for identifying an area within the image.

6. An image processing method, comprising the steps of:
sequentially acquiring images generated by imaging a predetermined subject to be imaged;
executing, in each of sequentially-arriving processing periods, image processing on the image acquired in the step of acquiring;
outputting an execution result of preprocessing performed on the image in part of the sequentially-arriving processing periods, the image having been acquired in the step of acquiring before the part of the sequentially-arriving processing periods; and
keeping holding, in execution result holding means, the execution result output in the step of outputting at least until the execution result is output next time in the step of outputting, wherein
the step of executing comprises executing the image processing by applying the execution result held in the execution result holding means to the image acquired in the step of acquiring, and
after the execution result of preprocessing performed in parallel with the image processing during the execution of the image processing by applying the execution result held in the execution result holding means is output to the execution result holding means in the step of outputting an execution result of preprocessing, executing the image processing by applying the output execution result multiple times until the next execution result of preprocessing is output to the execution result holding means in the step of outputting an execution result of preprocessing.

7. A program which is stored on a non transitory computer-readable information storage medium, the program controlling a computer to function as:
image acquiring means for sequentially acquiring images generated by imaging a predetermined subject to be imaged;
preprocessing executing means for executing preprocessing on the image acquired by the image acquiring means;
preprocessing execution result output means for outputting an execution result of the preprocessing;
means for keeping holding, in execution result holding means, the execution result output by the preprocessing execution result output means at least until the execution result is output next time by the preprocessing execution result output means; and
image processing executing means for executing image processing by applying the execution result held in the execution result holding means to the image acquired by the image acquiring means,
wherein, after the execution result of preprocessing performed in parallel with the image processing during the execution of the image processing by applying the execution result held in the execution result holding means is output to the execution result holding means by the preprocessing execution result output means, the image processing executing means executes the image processing by applying the output execution result multiple times until the next execution result of preprocessing is output to the execution result holding means by preprocessing execution result output means.

8. A non-transitory computer-readable information storage medium on which a program is stored, the program controlling a computer to function as:
image acquiring means for sequentially acquiring images generated by imaging a predetermined subject to be imaged;
preprocessing executing means for executing preprocessing on the image acquired by the image acquiring means;
preprocessing execution result output means for outputting an execution result of the preprocessing;
means for keeping holding, in execution result holding means, the execution result output by the preprocessing execution result output means at least until the execution result is output next time by the preprocessing execution result output means; and
image processing executing means for executing image processing by applying the execution result held in the execution result holding means to the image acquired by the image acquiring means,
wherein, after the execution result of preprocessing performed in parallel with the image processing during the execution of the image processing by applying the execution result held in the execution result holding means is output to the execution result holding means by the preprocessing execution result output means, the image processing executing means executes the image processing by applying the output execution result multiple times until the next execution result of preprocessing is output to the execution result holding means by the preprocessing execution result output means.

* * * * *